US010823077B2

(12) United States Patent
Van Assche et al.

(10) Patent No.: US 10,823,077 B2
(45) Date of Patent: Nov. 3, 2020

(54) PIN INSERT AND IGNITER ASSEMBLY

(71) Applicant: Unison Industries, LLC, Jacksonville, FL (US)

(72) Inventors: Frederick Martin Van Assche, Jacksonville, FL (US); Philip Nose Alberti, Jacksonville Beach, FL (US); Michael Thomas Kenworthy, Chandler, AZ (US)

(*) Notice: Subject to any disclaimer, the term of this patent is extended or adjusted under 35 U.S.C. 154(b) by 1022 days.

(21) Appl. No.: 15/283,623

(22) Filed: Oct. 3, 2016

(65) Prior Publication Data

US 2018/0094587 A1   Apr. 5, 2018

(51) Int. Cl.
*F02C 7/266* (2006.01)

(52) U.S. Cl.
CPC .................... *F02C 7/266* (2013.01)

(58) Field of Classification Search
CPC ......... F02C 7/266; H01T 13/08; H01T 13/20; H01T 13/32; H01T 13/39; H01T 13/465; H01T 13/50; H01T 13/54
USPC ...................................................... 60/39.827
See application file for complete search history.

(56) References Cited

U.S. PATENT DOCUMENTS

| | | | | |
|---|---|---|---|---|
| 2,028,971 A | * | 1/1936 | Falor | H01T 13/32 |
| | | | | 313/125 |
| 2,270,765 A | * | 1/1942 | Nowosielski | H01T 13/467 |
| | | | | 174/152 S |
| 3,911,672 A | * | 10/1975 | Irwin | F02C 7/266 |
| | | | | 60/796 |
| 8,386,054 B2 | | 2/2013 | North | |
| 8,534,041 B2 | * | 9/2013 | Mee | H01T 13/52 |
| | | | | 313/118 |
| 8,713,908 B2 | * | 5/2014 | Harding | F02C 7/266 |
| | | | | 60/39.821 |

* cited by examiner

*Primary Examiner* — Jesse S Bogue
*Assistant Examiner* — Loren C Edwards
(74) *Attorney, Agent, or Firm* — McGarry Bair, P.C.

(57) ABSTRACT

An igniter assembly for an engine, including a gas turbine engine, includes a shell comprising a tip end defining an opening and a sidewall extending away from the tip end where the sidewall surrounds a cavity within the shell and a tip insert assembly operably coupled to the tip end within the opening and having an insert body and a set of pins recessed within the insert body.

17 Claims, 8 Drawing Sheets

PIN INSERT AND IGNITER ASSEMBLY

BACKGROUND OF THE INVENTION

Contemporary engines including automotive and aviation engines include spark plugs to facilitate engine starting and/or running. Typically, a high-energy spark discharge occurs between a center electrode and a ground shell electrode to initiate combustion. Such igniters are typically known as surface gap spark plugs. The spark discharge in such igniters is of the high energy type because of the nature of the ignition system used to cause sparking. The system includes a storage capacitor which is charged as the voltage applied thereto and across the igniter increases and when the applied voltage becomes sufficiently large to cause a spark discharge the electrical energy stored by the capacitor is discharged, flowing across the spark gap.

BRIEF DESCRIPTION OF THE INVENTION

In one aspect, the present disclosure relates to an igniter includes a shell comprising a tip end defining an opening and a sidewall extending away from the tip end where the sidewall surrounds a cavity within the shell, a tip insert assembly operably coupled to the tip end within the opening and having an insert body with a first surface and a second surface and having an insert bore extending from the first surface to the cavity and a set of pins recessed within the insert body, and an electrode positioned within the cavity of the shell and having a distal firing end positioned proximate the insert bore.

In another aspect, the present disclosure relates to a pin insert assembly for an igniter having a shell includes an insert body having a first surface, a second surface, and an insert bore extending from the first surface to the second surface and where the insert body is configured to be coupled to the shell, and a set of pins recessed within the insert body.

In yet another aspect, the present disclosure relates to a gas turbine engine includes a combustor comprising a sidewall enclosing a combustion chamber and an igniter assembly extending at least partially through the sidewall such that a tip of the igniter assembly is in flow communication with the combustion chamber, the igniter assembly includes a shell comprising a tip end defining an opening and a sidewall extending away from the tip end where the sidewall surrounds a cavity within the shell, a tip insert assembly operably coupled to the tip end within the opening and having an insert body with a first surface and a second surface and having an insert bore extending from the first surface to the cavity and a set of pins recessed within the insert body and an electrode positioned within the cavity of the shell and having a distal firing end positioned proximate the insert bore.

DESCRIPTION OF EMBODIMENTS OF THE INVENTION

Figure 1:
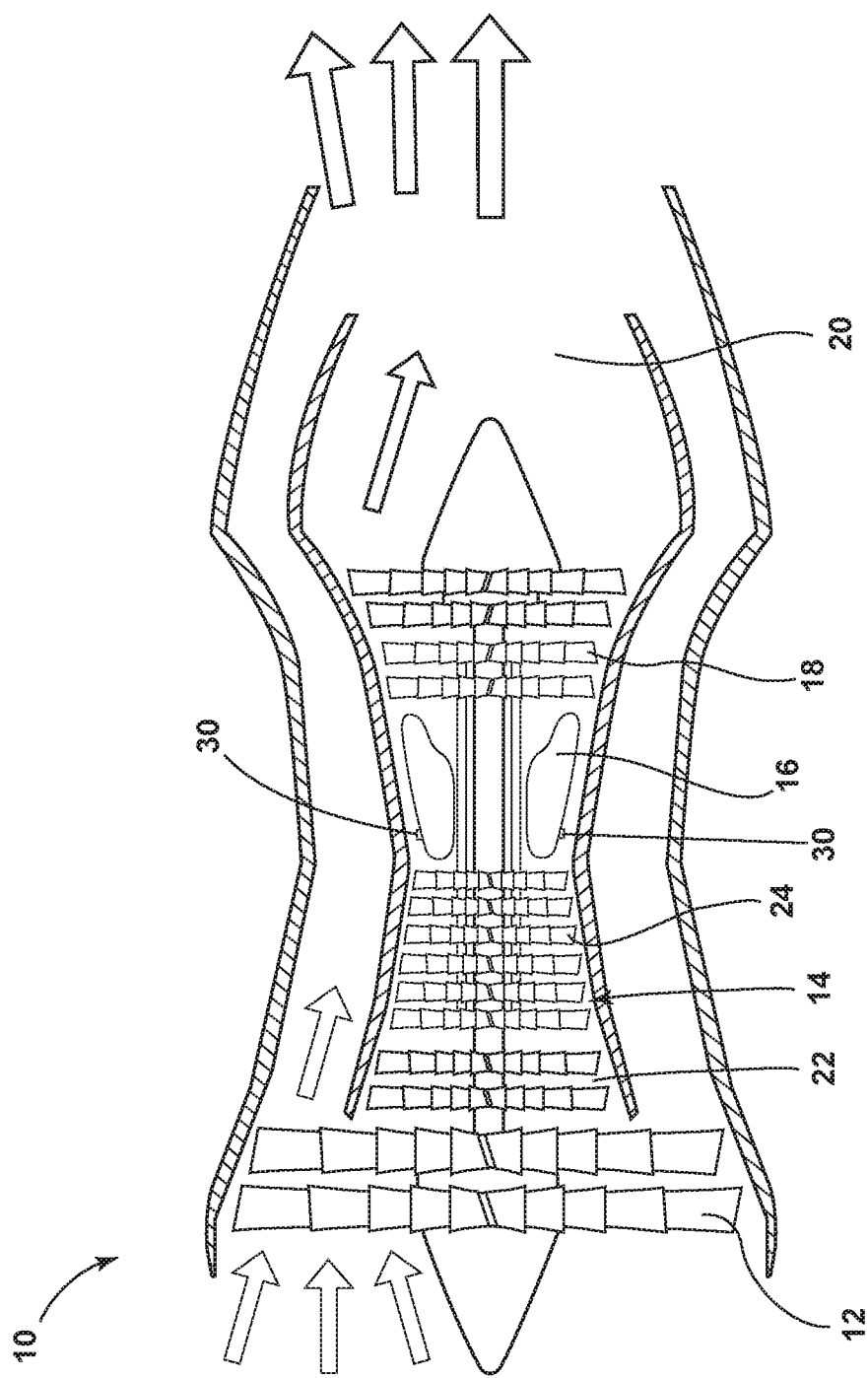
FIG. 1 is a schematic cross-sectional view of a gas turbine engine in accordance with various aspects described herein.

While "a set of" various elements will be described, it will be understood that "a set" can include any number of the respective elements, including only one element. All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

FIG. 1 illustrates a cross section of a gas turbine engine 10 that can be utilized in an aircraft. The gas turbine engine 10 can include, in a serial relationship, a fan 12, a compressor section 14, a combustion section 16, a turbine section 18, and an exhaust section 20. The compressor section 14 can include, in a serial relationship, a multi-stage low pressure compressor 22, and a multi-stage high pressure compressor 24. At least one igniter assembly 30 can be operably coupled proximate to the combustion section 16.

During gas turbine engine 10 operation, the rotation of the fan 12 draws in air, such that at least a portion of the air is supplied to the compressor section 14. The air is pressurized to a low pressure by the low pressure compressor 22, and then is further pressurized to a high pressure by the high pressure compressor 24. High pressure air is delivered to the combustion section 16, wherein the high pressure air is mixed with fuel and combusted. Specifically, the high pressure air is mixed with fuel in the combustion section 16 and ignited utilizing the igniter assembly 30, thereby generating combustion gases. Such combustion gases are delivered downstream to the turbine section 18, which are rotated by the gases passing through the turbine section 18. The rotation of the turbine section 18, in turn, rotates the fan 12 and the compressor section 14 upstream of the turbine section 18. Finally, the combusted gases are exhausted from the gas turbine engine 10 through the exhaust section 20. While a gas turbine engine 10 for a commercial aircraft has been illustrated, it is contemplated that embodiments of the disclosure can be used in any type of engine.

Figure 2:
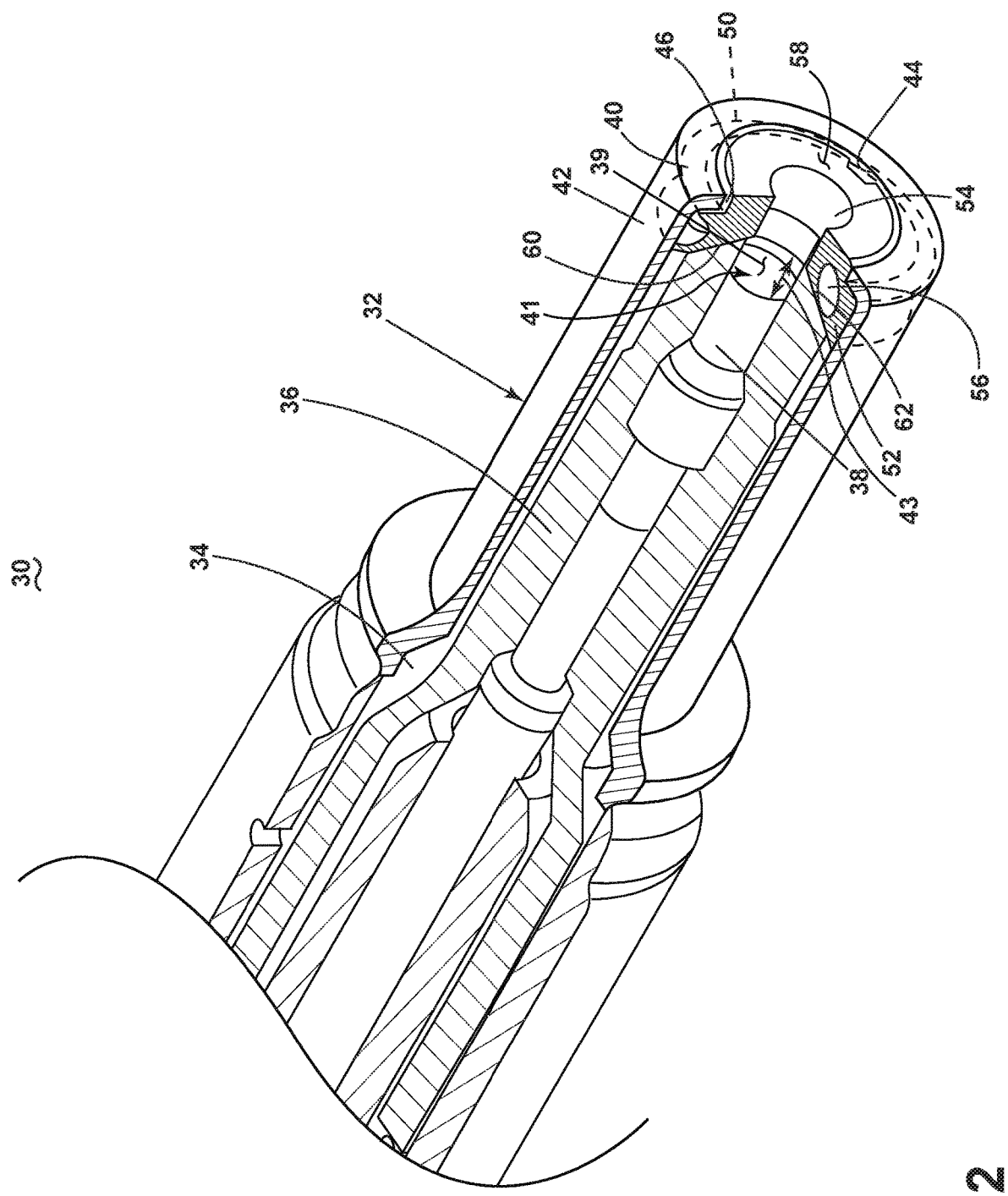
FIG. 2 is a perspective cutaway view of a portion of an igniter assembly that can be utilized in the gas turbine engine of FIG. 1, in accordance with various aspects described herein.

FIG. 2 illustrates an exemplary igniter assembly 30 having a shell 32, defining a cavity 34, an insulator 36, an electrode 38, and a tip insert assembly 50. A portion of the igniter assembly 30 has been cut away to better show interior portions of the igniter assembly 30.

The insulator 36 can be disposed within the cavity 34 between the shell 32 and the electrode 38. The insulator 36 can be inserted into the shell 32. In this manner, the shell 32 at least partially encloses the insulator 36 and the shell 32 can be electrically isolated from the electrode 38 by the insulator 36. The insulator 36 can be formed from any suitable insulating material including ceramic materials. The insulator 36 can include a hollow portion formed therein defining an insulator bore 39.

The electrode 38 can be located within the hollow portion or insulator bore 39 such that it is at least partially encapsulated by the insulator 36. As illustrated, the electrode 38 can be a center electrode or central electrode. A tip 41 of the electrode 38 can form a spark discharge portion. The electrode 38 can be formed from a suitable electrode material and have a distal firing end at the tip 41. The electrode 38 can be coupled to an internal conductor (not shown), which can include a wire, which is in turn operably coupled to a terminal. The terminal can be connected to the ignition system. Further, one or more ground electrodes (not shown) can be coupled to the shell 32 and spaced from the tip 41 of the electrode 38 to form a spark gap 43. In one non-limiting example, the spark gap 43 can include a proximate distance between the tip 41 of the electrode 38 and the tip insert assembly 50, wherein a spark can be generated between the tip 41 of the electrode 38 and the tip insert assembly 50. The ground electrode can be formed from any suitable material and coupled to the shell 32 in any suitable manner.

Figure 3:
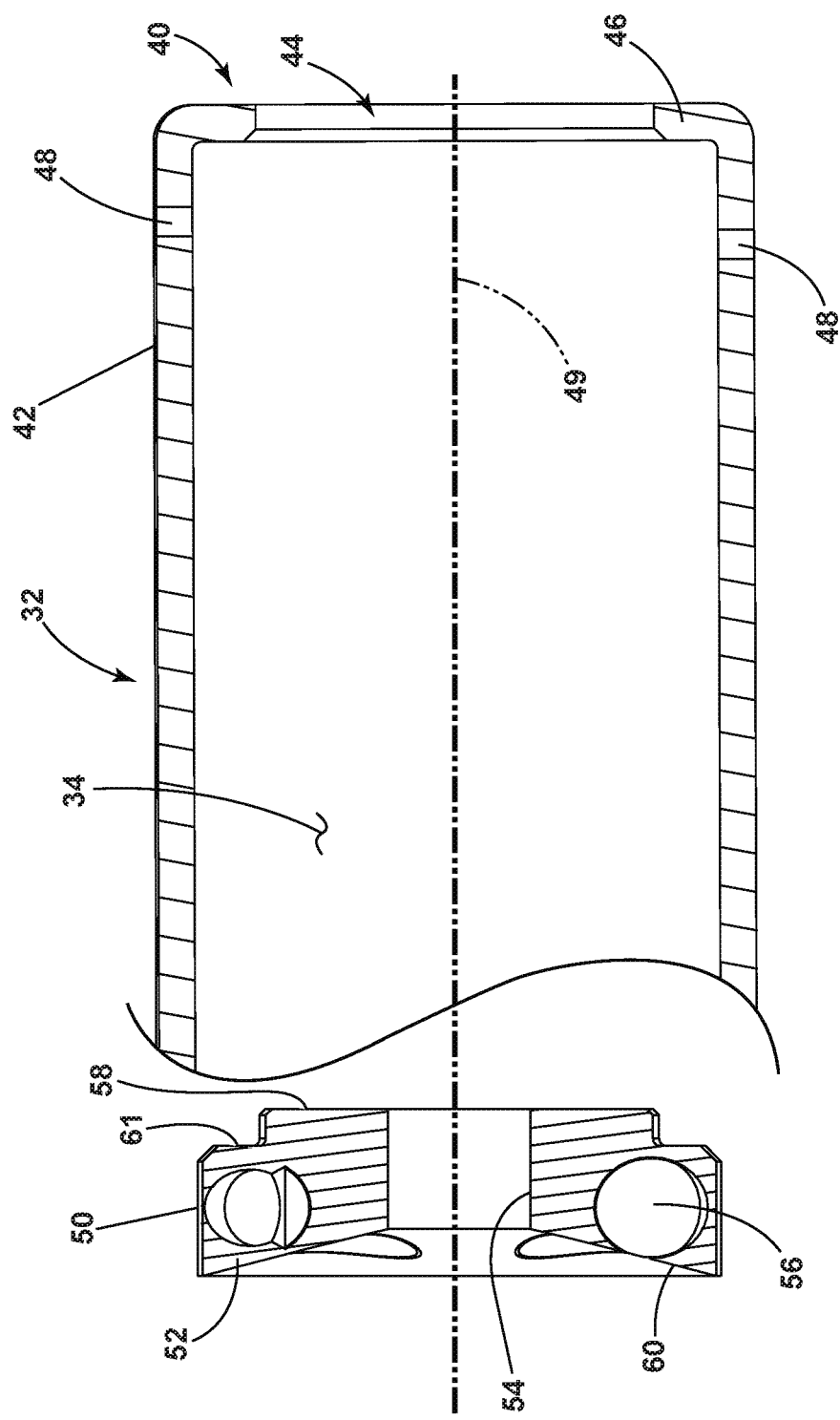
FIG. 3 is an exploded cross-sectional view of a portion of the igniter assembly and a tip insert assembly in accordance with various aspects described herein.

FIG. 3 illustrates a cross-sectional profile view of the tip insert assembly 50 removed from the shell 32. The shell 32 can be any suitable shell of any shape and material, including a substantially cylindrical shell. In one non-limiting example, the shell 32 can include a temperature resistant material configured or selected to structurally and thermally withstand the environmental conditions of the gas turbine engine 10. In another non-limiting example, the shell 32 can include an oxidation-resistant material. In yet another non-limiting example, the shell 32 can be selected or configured to provide structural support or electrical conduction. In yet another non-limiting example, the shell 32 can include a nickel-based superalloy. The shell 32 can include a shell assembly made of various pieces. Regardless of the number of pieces utilized for the shell 32, the shell 32 can include a tip end 40, and a sidewall 42 extending therefrom. The tip end 40 defines an opening 44. More specifically, in the illustrated embodiment, a lip 46 defines the opening 44. It will be understood that no lip or only a partial lip surrounding only a portion of the opening 44 need be included. The sidewall 42 surrounds the cavity 34 within shell 32.

A tip insert assembly 50 is operably coupled to or received by the tip end 40 of the shell 32, for example, along a common axis 49. The insert assembly 50 in the illustrated embodiment is located to be operably received within the cavity 34 and extends into the opening 44 such that it is substantially even with the lip 46. An insert body 52 having an insert bore 54 and a set of pins 56 recessed within the insert body 52 are included in the tip insert assembly 50. The insert body 52 includes a first surface 58 and a spaced opposing second surface 60. The insert bore 54 extends between the first surface 58 to second surface 60. The first surface 58 can include a recessed portion or recess 61. The recess 61 can correspond to the shape of the lip 46 of the shell 32. The interface between the lip 46 and the recess 61 aids in retaining the tip insert assembly 50 within the tip end 40. A weld can also be utilized to couple the tip insert assembly 50 to the shell 32 when assembled. An opening 48 can be included in the shell 32 and this can define the weld location. While a weld is described, aspects of the disclosure can be included wherein, for example, a mechanical interface or adhesive can be received in the opening 48 and configured to couple the tip insert assembly 50 to the shell 32 when assembled. Likewise, corresponding aspects of the tip insert assembly 50 can be configured to receive the mechanical fastener or provide a surface for adhesion, as needed.

Figure 4:
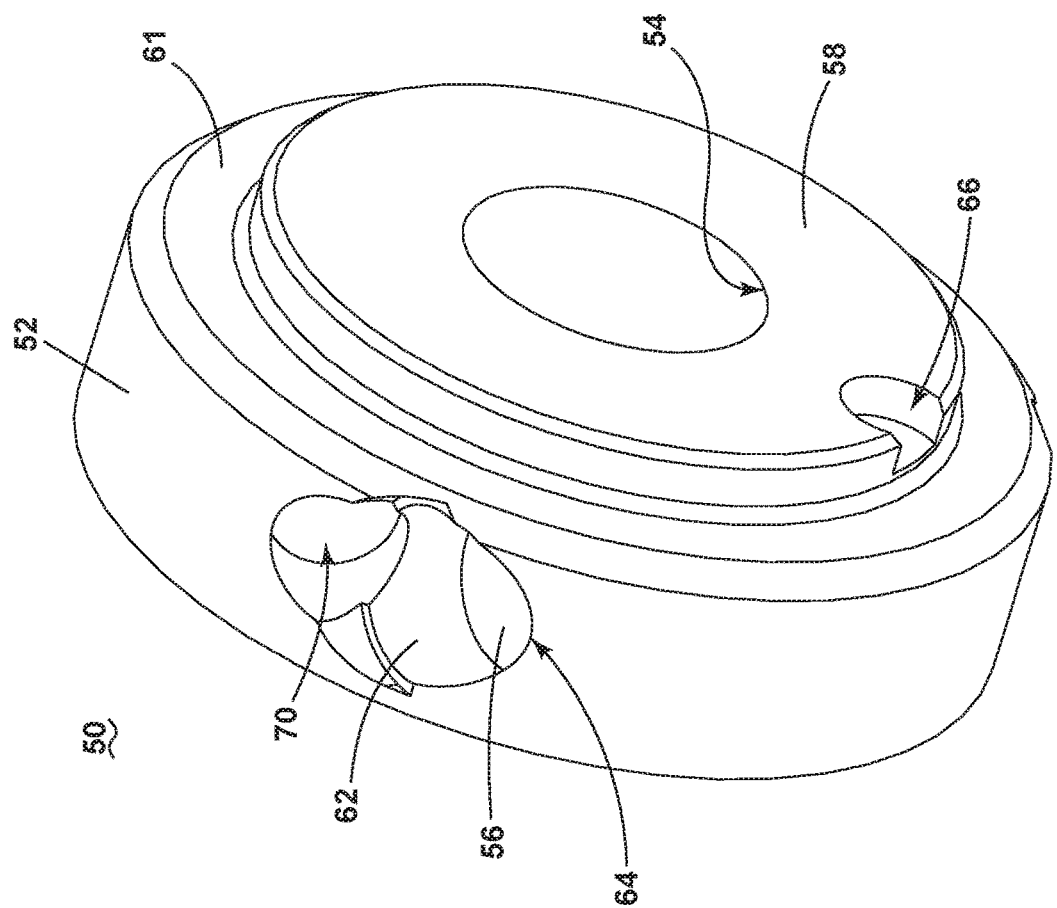
FIG. 4 is a perspective view of a first surface of the tip insert assembly of FIG. 3, in accordance with various aspects described herein.

FIG. 4 illustrates a perspective view of tip insert assembly 50 partially facing the first surface 58. The insert body 52 includes a set of slots 62, such as bores. By way of non-limiting example, the slot 62 includes an opening 64 and the slot is configured to receive a pin 56. A diameter or width of the slot opening 64 is approximately equal to the width of the pin 56. As the widths are approximately equal, the pin 56 can be retained within the slot 62 via an interference fit. Alternatively, the width of the slot opening 64 can be smaller or larger than that of the pin 56. Further, the pin 56 can be coupled to the insert body 52 using at least one of a braze or a weld. The insert body 52 can include a relief opening 70 adjacent a portion of the slot 62, such as at the opposing end of the slot 62 or bore, or adjacent to another slot. The relief opening 70 can be utilized for excess brazing or welding material to assure proper positioning of the pin 56. It will be understood that the set of pins 56 can be coupled to the insert body 52 using a braze joint, a weld joint, a friction fit, an interference fit, or a combination thereof. The first surface 58 of the tip insert assembly 50 can optionally include an indicator 66, such as an opening or visual marking, and configured for visually or automatic placement or alignment of the tip insert assembly 50 relative to the shell 32.

Figure 5:
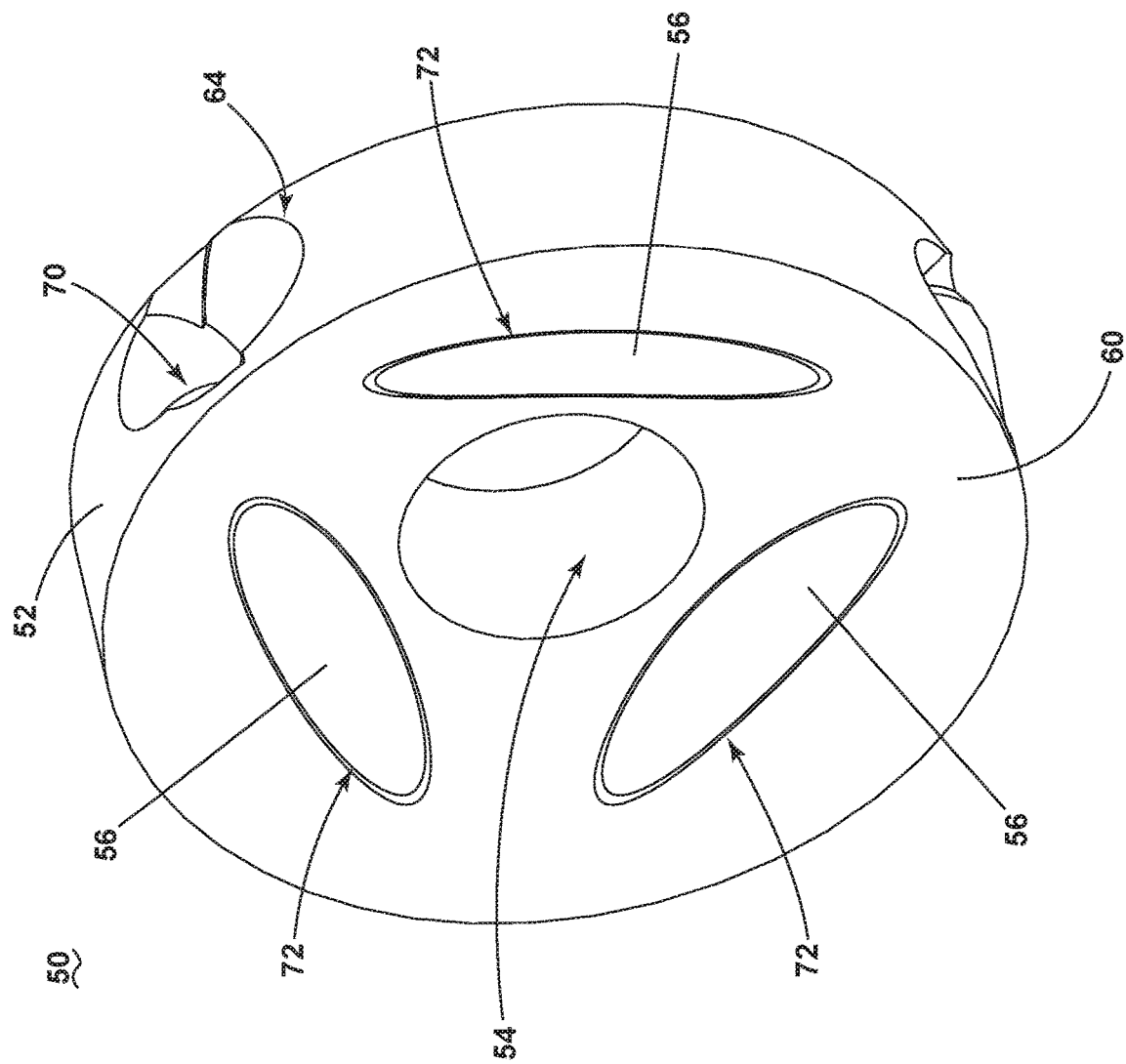
FIG. 5 is a perspective view of removed second surface of the tip insert assembly of FIG. 3, in accordance with various aspects described herein.

The insert body 52 can be formed in any suitable manner from any suitable material including, but not limited to, that the insert body 52 can be formed from a superalloy material. The set of pins 56 can also be formed from any suitable material including, but not limited to, a precious metal such as Iridium (Ir), Tungsten (W), Platinum (Pt), Rhodium (Rh), Ruthenium (Ru), Osmium (Os), or an alloy thereof. Further, the set of pins 56 includes an at least one of a circular cross-section, a partially circular cross-section, a polygonal cross-section, and an arcuate cross-section. If a braze material is used, then any suitable braze material can be utilized including, but not limited to, a BNi-9 braze material, FIG. 5 illustrates a perspective view of tip insert assembly 50 partially facing the second surface 60. As shown, the second surface 60 can be concavely curved. The configuration of the concavely curved second surface 60 can be configured to recede to a depth of the insert body 52 such that a portion 72 of the slot 62, or a pin 56 received by the slot 62 extends through a portion of the second surface 60. As shown, the portion 72 or the slot 62 or the pin 56 received by the slot 62 can be exposed at the second surface 60, or open to the cavity 34.

Figure 6:
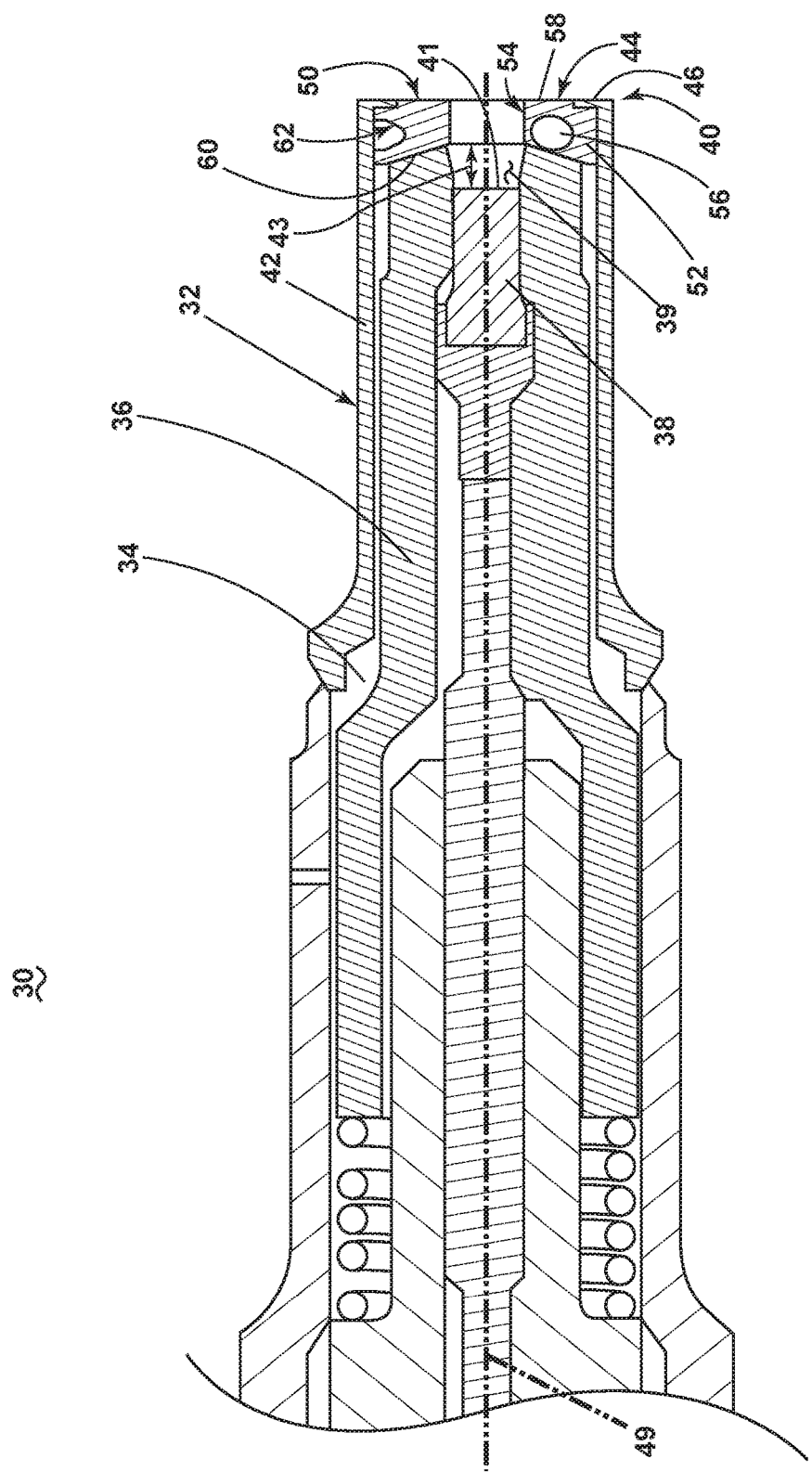
FIG. 6 is a cross section of the igniter assembly in accordance with various aspects described herein.

As better illustrated in FIG. 6, the insulator bore 39 can be in substantial axial alignment with substantial alignment with the insert bore 54 along the common axis 49. In the exemplary embodiment, shell 32, insulator 36, and electrode 38 are substantially concentrically aligned with insert bore 54 and insulator bore 39. However, they can alternatively be aligned differently with respect to each other. Further, while not shown, multiple insulators can be inserted into the shell 32.

During operation, the set of pins 56 inside the insert body 52 provide a sparking surface for energy delivered through the electrode 38 to the shell 32. The set of pins 56 contained within the insert body 52 provides a highly resilient sparking surface to slow igniter wear on the shell 32 and provide exceptionally long life for the igniter assembly 30. By recessing the set of pins 56 within a corrosion resistant material, the amount of electrode material lost to oxidation is minimal.

It will be understood that the igniter assembly 30 can be used in various types of engines including that the igniter assembly 30 can be a turbine igniter for use in aviation. Further, it will be understood that any number of pins 56 can be utilized.

Figure 7:
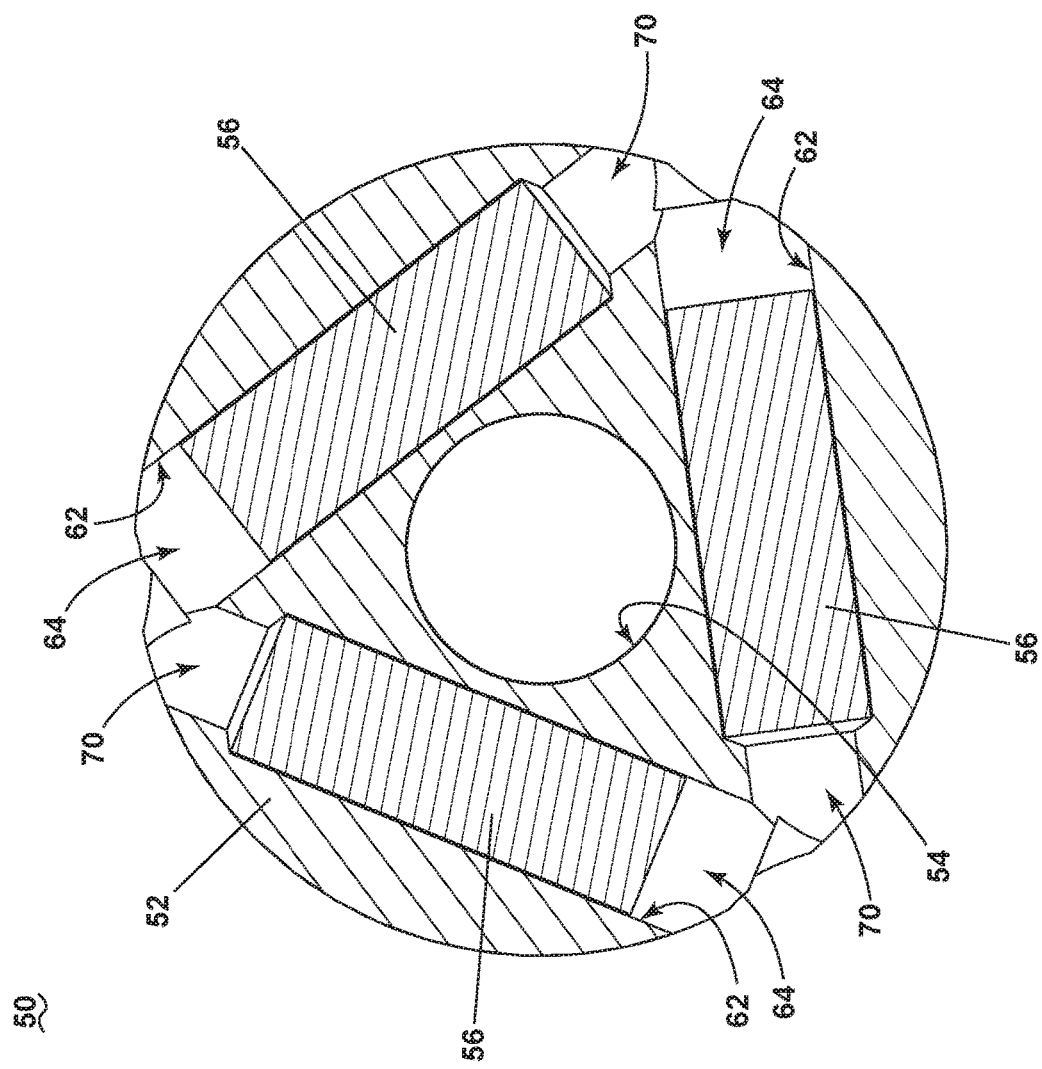
FIG. 7 is a cross section of the tip insert assembly, in accordance with various aspects described herein.
Figure 8:
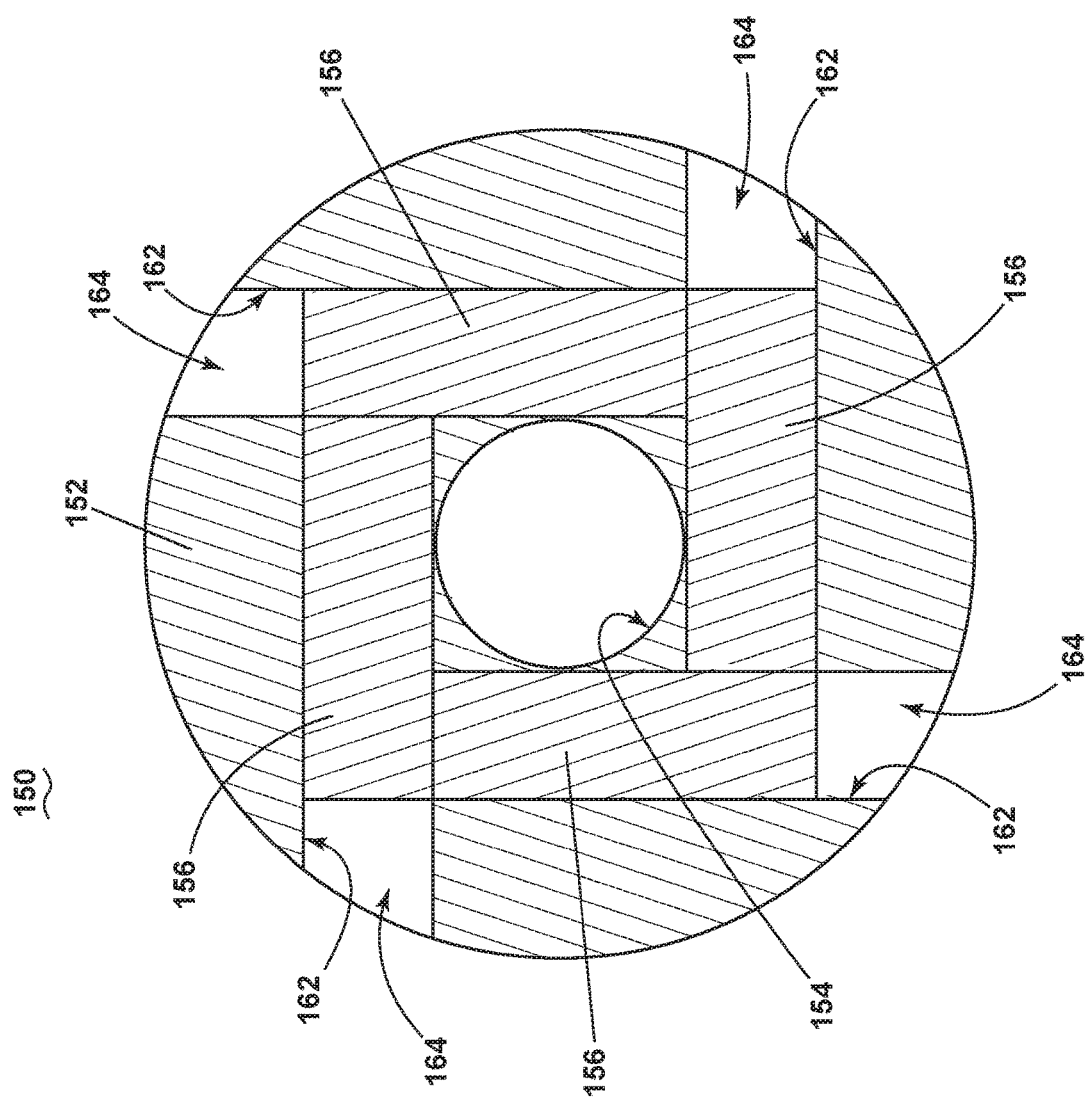
FIG. 8 is a cross section of another tip insert assembly, in accordance with various aspects described herein.

FIG. 7 illustrates a non-limiting cross-section of the tip insert assembly 50 illustrating a configuration having a set of three pins 56. FIG. 8 illustrates another non-limiting cross-section of a tip insert assembly 150 according to another aspect of the present disclosure. The tip insert assembly 150 is similar to the tip insert assembly 50; therefore, like parts will be identified with like numerals increased by 100, with it being understood that the description of the like parts of the tip insert assembly 50 applies to the tip insert assembly 150, unless otherwise noted. The tip insert assembly 150 illustrated includes a configuration of the insert body 152 having a set of four pins 156, received in a corresponding set of slots 162 via openings 164. While not illustrated, aspects of the disclosure can be included wherein a corresponding set of relief openings can be included in the tip insert assembly 150. While three pin and four pin 56, 156 configurations of the tip insert assembly 50, 150 have been illustrated, any number of pins and corresponding tip insert assemblies can be included. For instance, non-limiting examples of the tip insert assembly can include a single pin, two pin, three pin, four pin, or five pin configurations. The more pins utilized the better the pins can circumscribe the insert bore 154.

The above described embodiments provide a variety of benefits including that the insert body allows for a modular configuration. The insert body can be integrated in any igniter and the insert body design is scalable, so virtually any size tip can be accommodated. Further, such a modular design addresses problems with the wear life of traditional igniters. The described igniter assemblies have been shown to provide increased protection from spark erosion during igniter firing.

Further, the above described assemblies has increased suitability from a manufacturing perspective. The manufacturability of some prior art assemblies relies on a complex-geometry shell that required expensive braze paste, considerable finish machining and multiple braze cycles of electrodes and plugs into blind holes. In contrast, the above described assembly utilizes a smaller, simpler insert body. By nesting the insert body within a shell, the final machining and assembly operations are considerably simplified as compared to the prior art. The cost savings appears to be at least ten dollars per igniter assembly.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose aspects of the disclosure, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An igniter comprising:
   a shell comprising a tip end defining an opening and a cylindrical sidewall extending away from the tip end where the sidewall surrounds a cavity within the shell, the tip end configured to be received within a combustion chamber;
   a tip insert assembly operably coupled to the tip end within the opening and comprising:
   a circular insert body with a first surface and a second surface and having an insert bore extending from the first surface to the cavity; and
   a set of slots extending along chords of the circular insert body, each of the set of slots having a slot opening at a first end of the respective slot and a relief opening at a second end of the respective slot, each of the respective relief openings being smaller than the respective slot opening;
   a set of pins recessed within the respective set of slots of the insert body; and
   an electrode positioned within the cavity of the shell and having a distal firing end positioned proximate the insert bore;
   wherein the set of pins are receivable through the slot opening of a respective slot and not receivable through the relief opening.

2. The igniter of claim 1, further comprising an insulator positioned within the cavity between the shell and the electrode, the insulator comprising an insulator bore in substantial alignment with the insert bore.

3. The igniter of claim 2 wherein the shell, the insulator, and the electrode are substantially concentrically aligned with the insert bore and the insulator bore.

4. The igniter of claim 2 wherein the distal firing end is spaced apart from a pin of the set of pins by a spark gap.

5. The igniter of claim 1 wherein the set of pins are coupled to the insert body using at least one of a braze or a weld.

6. The igniter of claim 5 wherein a pin of the set of pins comprises a width and the insert body comprises the slot having the slot opening, the slot being configured to receive the pin, wherein a width of the slot opening is approximately equal to the width of the pin.

7. The igniter of claim 6 wherein a portion of the slot extends through a portion of the second surface such that the pin is open to the cavity.

8. The igniter of claim 1 wherein the second surface is concavely curved.

9. The igniter of claim 1 wherein the tip end comprises a lip and the insert body comprises a corresponding recess in the first surface.

10. The igniter of claim 1 wherein the tip insert assembly is coupled to the shell via a weld.

11. The igniter of claim 1 wherein the set of pins includes a single pin, two pins, three pins, or four pins.

12. A pin insert assembly for an igniter having a shell configured to be received within a combustion chamber, comprising:
- a circular insert body having a first surface, a second surface, and an insert bore extending from the first surface to the second surface and where the insert body is configured to be coupled to the shell;
- a set of slots extending along chords of the circular insert body, each of the set of slots having a slot opening at a first end of the respective slot and a relief opening at a second end of the respective slot, each of the respective relief openings being smaller than the respective slot opening; and
- a set of pins recessed within the respective set of slots of the insert body.

13. The pin insert assembly of claim 12 wherein each slot of the set of slots is configured to receive the respective pin of the set of pins.

14. The pin insert assembly of claim 12 wherein the second surface is concavely curved.

15. The pin insert assembly of claim 12 wherein the insert body comprises a recess in the first surface configured to mate with an opening of the shell.

16. A gas turbine engine comprising:
- a combustor comprising a sidewall enclosing a combustion chamber; and
- an igniter assembly extending at least partially through the sidewall such that a tip of the igniter assembly is in flow communication with the combustion chamber, the igniter assembly comprising:
  - a shell comprising a tip end defining an opening and a shell sidewall extending away from the tip end where the shell sidewall surrounds a cavity within the shell;
  - a tip insert assembly operably coupled to the tip end within the opening and comprising:
  - a circular insert body with a first surface and a second surface and having an insert bore extending from the first surface to the cavity;
  - a set of slots extending along chords of the circular insert body, each of the set of slots having a slot opening at a first end of the respective slot and a relief opening at a second end of the respective slot, each of the respective relief openings being smaller than the respective slot opening; and
  - a set of pins recessed within the respective set of slots of the insert body; and
  - an electrode positioned within the cavity of the shell and having a distal firing end positioned proximate the insert bore.

17. The gas turbine engine of claim 16 wherein a pin of the set of pins comprises a width, wherein each slot of the set of slots is configured to receive the pin, and wherein a width of the slot opening is approximately equal to the width of the pin.

* * * * *